United States Patent [19]

Bertsch et al.

[11] Patent Number: 4,665,757
[45] Date of Patent: May 19, 1987

[54] FLOW RATE METER WITH PRESSURE EQUALIZER CONDUIT

[75] Inventors: Richard Bertsch, Asperg; Eberhard Biermann, Uhldingen; Dieter Gunther, Murr; Claus Ruppmann, Stuttgart; Erwin Nagele, Hessigheim, all of Fed. Rep. of Germany

[73] Assignee: Robert Bosch GmbH, Stuttgart, Fed. Rep. of Germany

[21] Appl. No.: 841,987

[22] Filed: Mar. 20, 1986

[30] Foreign Application Priority Data

May 11, 1985 [DE] Fed. Rep. of Germany ....... 3517040

[51] Int. Cl.$^4$ .............................................. G01F 1/28
[52] U.S. Cl. .................................. 73/861.76; 73/118.2
[58] Field of Search ............... 73/118, 861.76, 861.75; 123/494

[56] References Cited

U.S. PATENT DOCUMENTS

| | | |
|---|---|---|
| 3,823,696 | 7/1974 | Motschler et al. . |
| 4,040,295 | 8/1977 | Romann . |
| 4,043,188 | 8/1977 | Stein et al. .................... 73/861.76 X |
| 4,111,045 | 9/1978 | Sauer et al. ...................... 73/861.76 |
| 4,346,589 | 8/1982 | Kienzle et al. . |
| 4,392,386 | 7/1983 | Knetsch et al. . |
| 4,474,068 | 10/1984 | Knetsch et al. . |

*Primary Examiner*—Herbert Goldstein
*Attorney, Agent, or Firm*—Edwin E. Greigg

[57] ABSTRACT

A flow rate meter which serves to ascertain the mass of a flowing medium, in particular the flow rate of the air aspirated by an internal combustion engine via its air intake tube. The flow rate meter includes a measuring device that is pivotable about a bearing shaft in a flow conduit, in order to reduce the measurement error at maximum flow rate of the medium, a connecting conduit discharges downstream of the measuring device and its opening remote from the flow conduit leads into the damping chamber.

4 Claims, 1 Drawing Figure

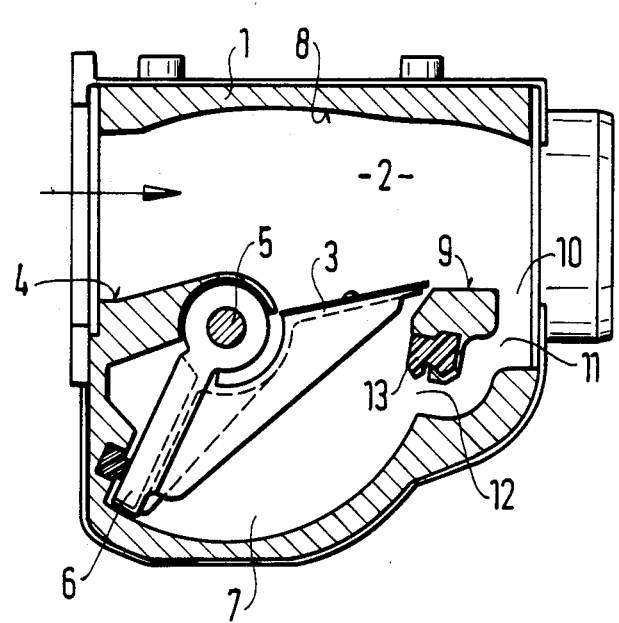

FLOW RATE METER WITH PRESSURE EQUALIZER CONDUIT

RELATED APPLICATION

This application is copending with application Ser. No. 695,033 filed Jan. 25, 1985 assigned to the same assignee.

BACKGROUND OF THE INVENTION

The invention is based on a flow rate meter as defined hereinafter. A flow rate meter is already known in which changes in the position of the measuring valve can occur abruptly when the flow rate of a medium is in the vicinity of its maximum. When such a device is used in the intake line of internal combustion engines, this abrupt change causes an incorrect adjustment of the fuel mixture of the engine, which can result in errors in adaptation and in vehicle operation.

OBJECT AND SUMMARY OF THE INVENTION

The flow rate meter according to the invention has the advantage over the prior art of preventing abrupt changes in the position of the measuring valve and of providing an output signal that is virtually proportional to the air flow rate in the critical operating ranges of the air flow rate meter. A further advantage is attained by the opportunity for standardization, with an attendant reduction in production cost, by omitting an individual adjustment of the air flow rate meter characteristic to specific operating requirements.

The invention will be better understood and further objects and advantages thereof will become more apparent from the ensuing detailed description of a preferred embodiment taken in conjunction with the drawing.

BRIEF DESCRIPTION OF THE DRAWING

The single drawing figure shows in cross-section the improved flow rate meter with the measuring device in its maximally deflected position.

DESCRIPTION OF THE PREFERRED EMBODIMENT

In the case of the flow rate meter shown by way of example in the drawing, the air mass aspirated for instance by an internal combustion engine via an air intake tube flows in the direction of the arrow through a flow conduit 2, which is embodied in a housing 1 and has a measuring valve 3 that acts as a measuring device, to the individual cylinders, not shown, of the engine. At one end, the measuring valve 3 is pivotably supported about a bearing shaft 5 in the vicinity of one wall 4 of the flow conduit 2. By suitably supporting the measuring valve 3 on the bearing shaft 5 via ball bearings, the pivoting movement of the measuring valve 3 is made virtually friction-free. For the particular use of the flow rate meter in the air intake tube of an internal combustion engine, it is appropriate to connect a damping valve 6 to the measuring valve 3 in order to damp pulsations; the damping valve 6 is disposed in a damping chamber 7 and is likewise pivotable about the bearing shaft 5. The deflection of the measuring valve brought about by the inflowing air mass takes place for instance counter to the spring force of a spiral spring that engages the bearing shaft 5 but is not shown. The angular position of the measuring valve 3 or of the bearing shaft 5 may be picked up electrically via a potentiometer, for example, as a measure of the air flow rate.

The particular curve of the flow rate meter shown, which is characterized by the angular position of the measuring valve 3 as a function of the aspirated air mass, takes an exponential course. One possibility for varying the characteristic curve of the flow rate meter is provided by the selection of the profile of the wall 8 that defines the flow conduit 2 and is located opposite the side of the flow conduit 2 that receives the bearing shaft 5. Downstream of the measuring valve 3, on the side of the flow conduit 2 that receives the bearing shaft 5, there is a wall 9 having an opening 10, which is adjoined by a pressure equalizing conduit 11 having a further opening 12 which enters damping chamber 7. The opening 12 extends below a bumper 13, which serves as a stop for the damping valve 6. The damping chamber 7 is defined by the flow conduit 2 and the housing 1 and the profile of the damping chamber is defined by the pivoting range of the damping valve 6. The bumper 13 comprises an elastic, shock-absorbing material and is made up of two segments. The first segment serves to secure the bumper 13 in the housing portion 9, defined by the flow conduit 2, the damping chamber 7 and above the opening 12 in the pressure equalizing conduit 11. The second segment of the bumper 13 protrudes into the damping chamber juxtaposed opening 12, and its position is determing by the position of the damping valve 6 when the flow rate in the flow conduit 2 drops to zero, with the bumper 13 located above the position of the damping valve 6, which rests thereupon. It has been found that because of the pressure equalizing conduit 11, a substantially equalized pressure is assured between the flow conduit 2 and the damping chamber 7, even at a maximum flow rate; as a result, the measuring signal that is generated is proportional to the flow rate of the medium.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A flow rate meter for measuring the mass of air aspirated by an internal combustion engine via an air intake tube comprising:
    a housing,
    a flow conduit embodied in the housing;
    a damping chamber in parallelism with said flow conduit,
    a measuring body disposed in the flow conduit, said measuring body comprising a measuring valve operative in said flow conduit and a damping valve attached to the measuring valve at a predetermined angle and operative in said damping chamber,
    a bearing shaft in said housing about which said measuring body is pivotable counter to a restoring force as a function of this flow rate of the medium, said bearing shaft located on one side of the flow conduit,
    a wall downstream of said bearing shaft,
    said housing including a pressure equalizing conduit in said wall located downstream of the measuring valve on the side of the flow conduit that receives the bearing shaft of the measuring body, said pressure equalizing conduit including an opening which extends from said flow conduit to said damping chamber, a bumper on said wall along said opening at said damping chamber which functions to absorb any shock of said measuring body when moved by said restoring force through a maximal deflection of the measuring body when the flow rate of the mass of air is zero and said pressure equalizing conduit opens into said damping chamber in an area between the measuring valve and the damping valve during measurement of any air flow whereby air flows in said pressure equalizing conduit between said damping chamber and said flow conduit downstream of the measuring body.

2. A flow rate meter as defined by claim 1, in which said bumper is secured in the boundary of the damping chamber in which the opening of the pressure equalizing conduit is located on the side of the bumper remote from the flow conduit.

3. A flow rate mater as defined by claim 2, in which said bumper is secured in a wall spaced from a damper chamber wall thereby forming a portion of said pressure equalizing conduit.

4. A flow rate meter as defined by claim 3, in which said pressure equalizing conduit extends from an opening into said damper chamber below said bumper to an opening in said flow conduit downstream of said measuring valve.

* * * * *